United States Patent [19]

Wylie

[11] 4,126,190
[45] Nov. 21, 1978

[54] TWIN ROW CULTIVATOR

[75] Inventor: M. Lynn Wylie, Albany, Ga.

[73] Assignee: Lilliston Corporation, Albany, Ga.

[21] Appl. No.: 718,120

[22] Filed: Aug. 27, 1976

[51] Int. Cl.² .............................................. A01B 19/08
[52] U.S. Cl. ..................................... 172/624; 172/646
[58] Field of Search .............. 172/634, 484, 639, 395, 172/620, 657, 629, 624, 619, 623, 632, 646, 307; 111/66, 67

[56] References Cited

U.S. PATENT DOCUMENTS

| | | | |
|---|---|---|---|
| 2,941,606 | 6/1960 | Gillette | 172/307 |
| 3,208,535 | 9/1965 | Fischer | 172/667 |
| 3,327,786 | 6/1967 | Meyer | 172/307 |
| 3,539,019 | 11/1970 | Mattson | 172/688 |
| 3,627,061 | 12/1971 | Sample | 172/646 |
| 3,921,726 | 11/1975 | Connor | 172/646 |
| 3,998,275 | 12/1976 | Eisenhardt | 172/142 |

FOREIGN PATENT DOCUMENTS 696,973  9/1953  United Kingdom ..................... 172/484

Primary Examiner—Richard J. Johnson
Attorney, Agent, or Firm—Newton, Hopkins & Ormsby

[57] ABSTRACT

A cultivator frame assembly particularly adapted for cultivation of bed-planted crops comprises a parallelogram linkage frame adapted to be attached to a conventional tool bar and a bed cultivator frame carried by the parallelogram linkage frame. The bed cultivator frame provides a series of longitudinally spaced tool bars for mounting the gauge wheel and such cultivating tools as will properly cultivate the multiple crop rows of each bed. The two frames are readily detached so that various forms of the bed cultivator frame may be employed with the common parallelogram linkage frame, as need arises.

3 Claims, 9 Drawing Figures

4,126,190

TWIN ROW CULTIVATOR

BACKGROUND OF THE INVENTION

This invention relates to cultivator devices particularly adapted to cultivate rows of crops planted on beds. Bed planting is common for certain types of row crops in irrigated areas. With close-spaced row crops such as sugar beets, lettuce and certain other vegatable crops, two or more rows are sometimes planted close together on a single bed. For example, beds might be on 40 or 42 inch centers with two rows 12 to 16 inches apart on each bed. The beds may initially be formed by a machine such as is disclosed in the Richey U.S. Pat. No. 3,347,188.

The variety of crops planted on beds creates special problems and due to the wide variety of crops involved and their differing cultivation requirements, the construction of the two supporting frames presents special difficulties. In particular, there is a limited lateral spacing within which to accommodate all of the cultivating tools which may be required while, at the same time, the supporting frame assembly must be sufficiently rugged as to withstand the forces generated in use.

BRIEF SUMMARY OF THE INVENTION

Accordingly, it is of primary concern in connection with this invention to provide an improved cultivator assembly particularly adapted for the cultivation of crops planted in closely spaced rows on a common bed.

Generally speaking, the invention involves the use of a parallelogram linkage frame adapted to be attached to a conventional tool bar and a bed cultivator frame carried by the parallelogram linkage frame. The parallelogram linkage frame itself features a tool bar member serving not only the tool supporting function but also the function of rigidifying the parallelogram linkage frame. The bed cultivator frame provides a series of longitudinally spaced tool bars and the tool bars on the bed cultivating frame are in cooperative relation with the tool bar incorporated in the parallelogram linkage frame. All of the tool bars of the frame assembly are effective to mount a gauge wheel which controls the proper working depth of the tools in association with the parallelogram linkage, and such cultivating tools as will properly cultivate the multiple crop rows on the bed.

BRIEF DESCRIPTION OF THE DRAWING FIGURES

DETAILED DESCRIPTION OF THE INVENTION

Figure 1:
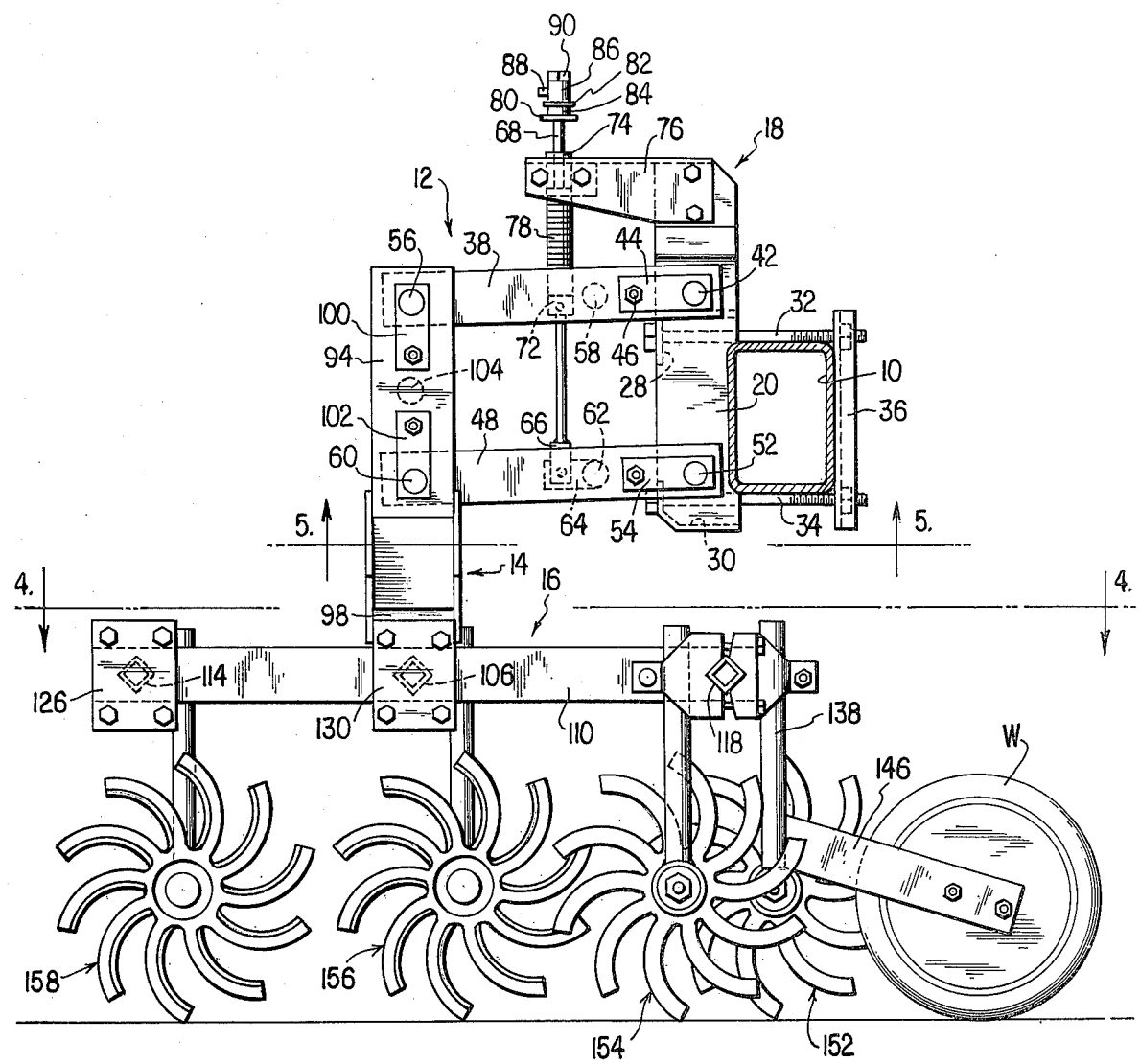
FIG. 1 is a side elevational view of an illustrative embodiment of the invention.

In the assembly shown in FIG. 1, the reference character 10 indicates the main tool bar which may be of any conventional form and which, it will be understood, is attached to a towing vehicle such as a tractor through the medium of the conventional lift arms provided for that purpose. The cultivator attachment according to this invention consists essentially of the parallelogram linkage frame indicated generally by the reference character 12 which is attached to the tool bar 10 and which includes the depending yoke assembly indicated generally by the reference character 14, to the lower end of which the bed cultivator frame indicated generally by the reference character 16 is attached.

Figure 2:
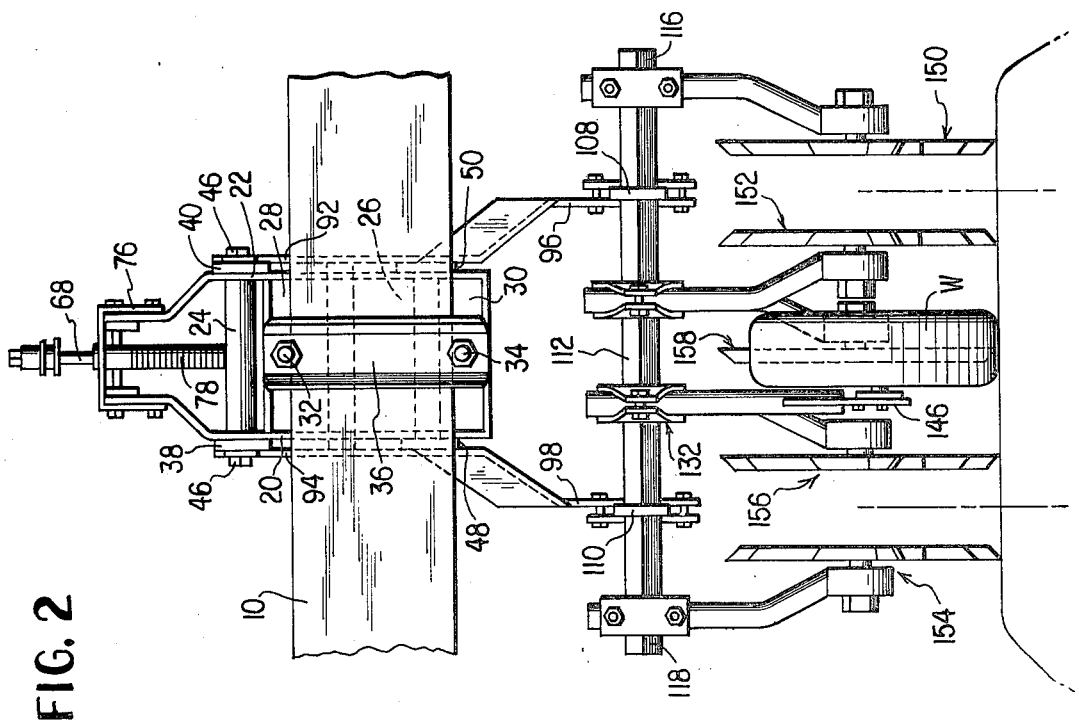
FIG. 2 is a front elevational view of the assembly shown in FIG. 1.

As may be seen more clearly in FIG. 2, the parallelogram linkage frame 12 includes the mast structure indicated generally by the reference character 18 which may take the form of a pair of laterally spaced and vertically extending side plates 20 and 22 joined by the upper and lower tubular members 24 and 26 as well as by the upper and lower plates 28 and 30. The two plates 28 and 30 are apertured to receive the respective clamping bolts 32 and 34 which cooperate with the clamping bar 36 rigidly to mount the assembly 12 on the tool bar 10.

Figure 5:
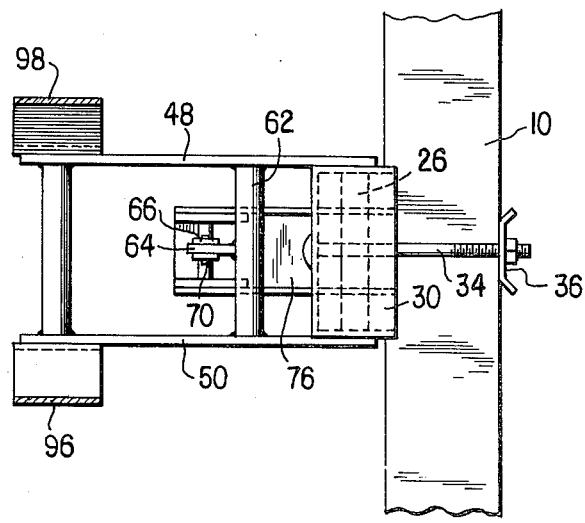
FIG. 5 is a horizontal section taken substantially along the plane of Section line 5—5 in FIG. 1.
Figure 6:
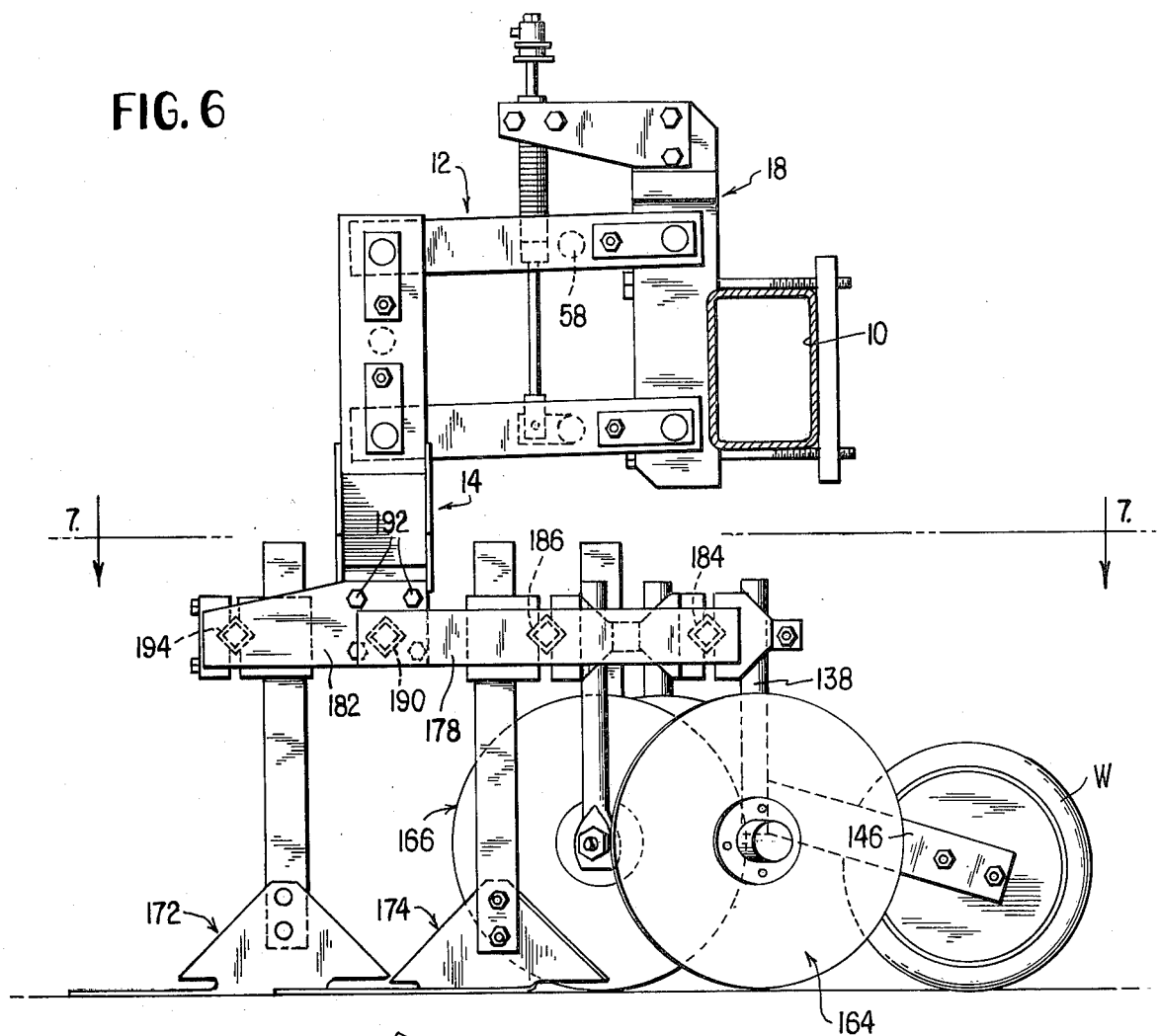
FIG. 6 is a side elevational view of another illustrative embodiment of the invention.

The upper link of the parallelogram linkage is provided by the two arms 38 and 40 which are pivotally attached to the mast 18 by means of stub axle pivots such as the pivot 42 shown in FIG. 1. Each of these stub axles or shafts is welded to a tab member 44 which is bolted as at 46 to the appropriate arm 38 or 40. Similarly, the lower linkage is comprised of the two arms 48 and 50 pivotally secured to the mast 18 as by the axles 52 and associated tabs 54. The arms 38 and 40 are rigidly joined together at their free ends by a bridging tubular member 56 and, between their ends, by a further cross brace or tubular member 58. Similarly, the lower arms 48 and 50 are joined at their free ends by the bridging tubular member 60 and the intermediate cross member 62, see particularly FIG. 5. The member 62 has an ear 64 welded thereto which is straddled by the bifurcated end portion 66 of the rod 68, the bifurcation being pivotally attached to the ear 64 by means of the pin 70 as is shown in FIG. 5. The rod 68 carries a stop collar 72 adjustably locked thereon as by means of a set screw and a trunnion 74 is pivotally mounted about a horizontal transverse axis to the nose 76 of the mast 18. Between these two members 72 and 74 is disposed a compression spring 78 whereby to control downward pressure upon the linkage 12 for purposes presently apparent. The upper end of the rod 68 carries a snubber comprising the washers 80 and 82 and an intervening block 84 of resilient material such as rubber, this snubber being surmounted by the stop collar 86 similar to the collar 72 and locked to the rod 68 by means of the set screw 88. A lock nut 90 is provided to secure the snubber positively in place. The rod 68 freely moves through the trunnion 74 and when the linkage 12 drops to a lowermost position, the snubber cushions the assembly.

Figure 3:
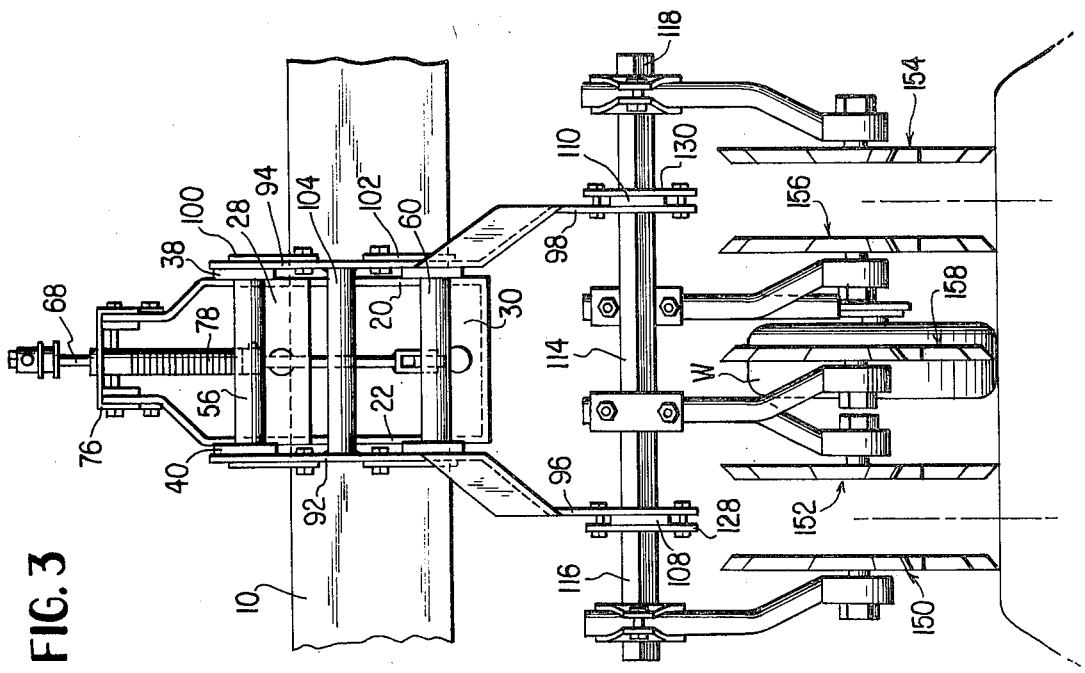
FIG. 3 is a rear elevational view of the assembly shown in FIG. 1.
Figure 4:
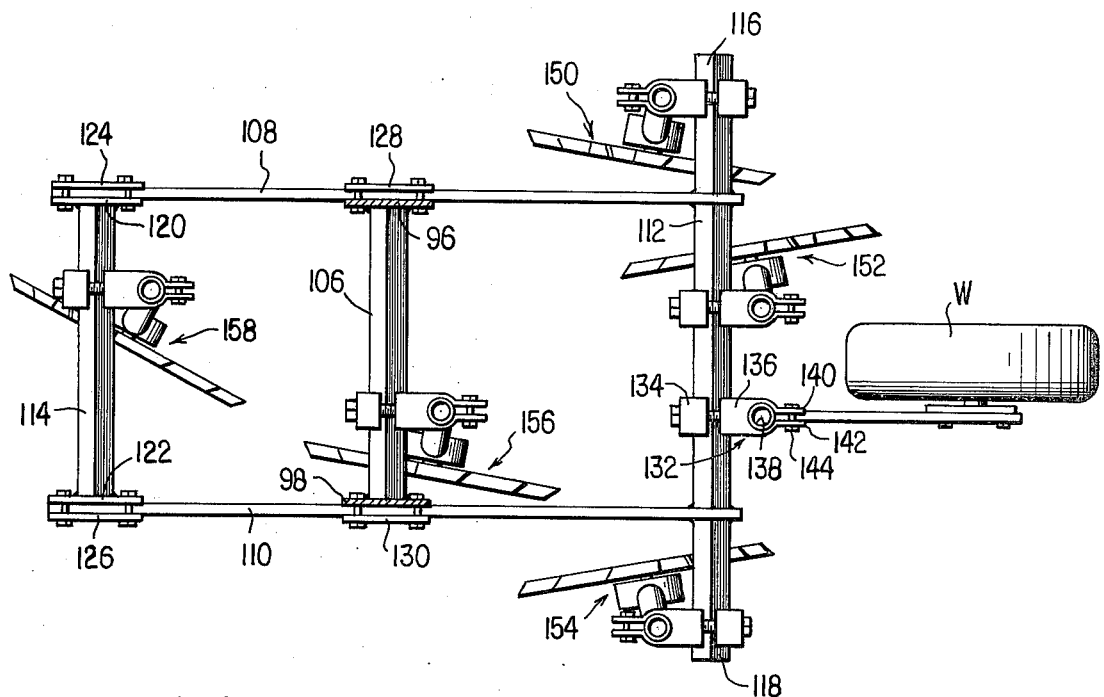
FIG. 4 is a horizontal section taken generally along the plane of Section line 4—4 in FIG. 1.

The free ends of the upper and lower link arms pivotally carry the yoke assembly 14 which, as will be seen from FIG. 3 comprise the two side plate member 92 and 94 which diverge at their lower ends to terminate in the depending leg portions 96 and 98. The arms 38 and 40 and the arms 48 and 50 are pivotally joined to the respective side plates 92 and 94 by means of the stub axles or shafts 56 and 60 and associated tabs 100 and 102. The plates 92 and 94 are rigidly joined by means of a cross brace or tubular member 104 and the lower end of the yoke assembly is rigidified by the tool bar member 106 which bridges between and is rigidly joined to the two feet 96 and 98, see particularly FIG. 3. A bed cultivator frame is more clearly illustrated in FIG. 4 wherein it will be seen that it includes the opposite side rails 108 and 110 provided with a forward tool bar 112 and a rear tool bar 114. The forward tool bar is permanently joined to the side rails 108 and 110 and presents opposite end portions 116 and 118 which project laterally from each of the respective side rails. The rear tool bar 114 is provided at its opposite ends with the attaching plates 120 and 122 which abut against the inner surfaces of the side rails 108 and 110 and cooperate with the clamping plates 124 and 126 securely to sandwich the respective side rails 108 and 110 therebetween, thus allowing the rear tool bar 114 to be positioned at a desired longitudinal position on the side rails 108 and 110. FIG. 4 also illustrates the fact that the two legs 96 and 98 of the yoke assembly 14 likewise abut against the inner faces of the side rails 108 and 110 and cooperate with the respective clamping plates 128 and 130 securely to clamp, in adjustable longitudinal fashion, the side rails therebetween, as shown. The tool bars are of conventional design, incorporating a square cross-section adapted to receive conventional double clamping tool attachment units such as the one indicated generally by the reference character 132. Such devices include the cooperable portions 134 and 136 which are adapted to clamp the tool bar therebetween and the latter of which includes a split clamping unit adapted to receive the post 138 of an associated tool device or the like. The split portion 136 is of circular cross-section so that the post 138 may be oriented in a desired rotational relation therewithin and the ear portions 140 and 142 in association with the bolt and nut assembly 144 serve securely to clamp the post in the desired position both rotationally and longitudinally thereof. In the embodiment shown, the post 138 carries a gauge wheel W rotatably supported at the forward end of a leading arm member 146 fixed to the lower end of the post 138 and projecting therefrom as is illustrated more clearly in FIG. 1. This particular type of bed cultivator frame is particularly suited for cultivating two rows of a crop such as peppers. The two spiders 150 and 152 while mounted on the forward tool bar 112 and are angled inwardly as illustrated in FIG. 4 in order to move the soil away from the crop row on either side of the row which is straddled by the two spiders 150 and 152. The spiders 154 and 156, on the other hand, are similarly set to move the soil away from the other row of peppers or the like, the spider 156 in this case being located on the tool bar 106 which forms part of the parallelogram linkage frame. Finally, the rear spider 158 is set between the two rows to cultivate this area of the bed and to equalize soil flow.

Figure 7:
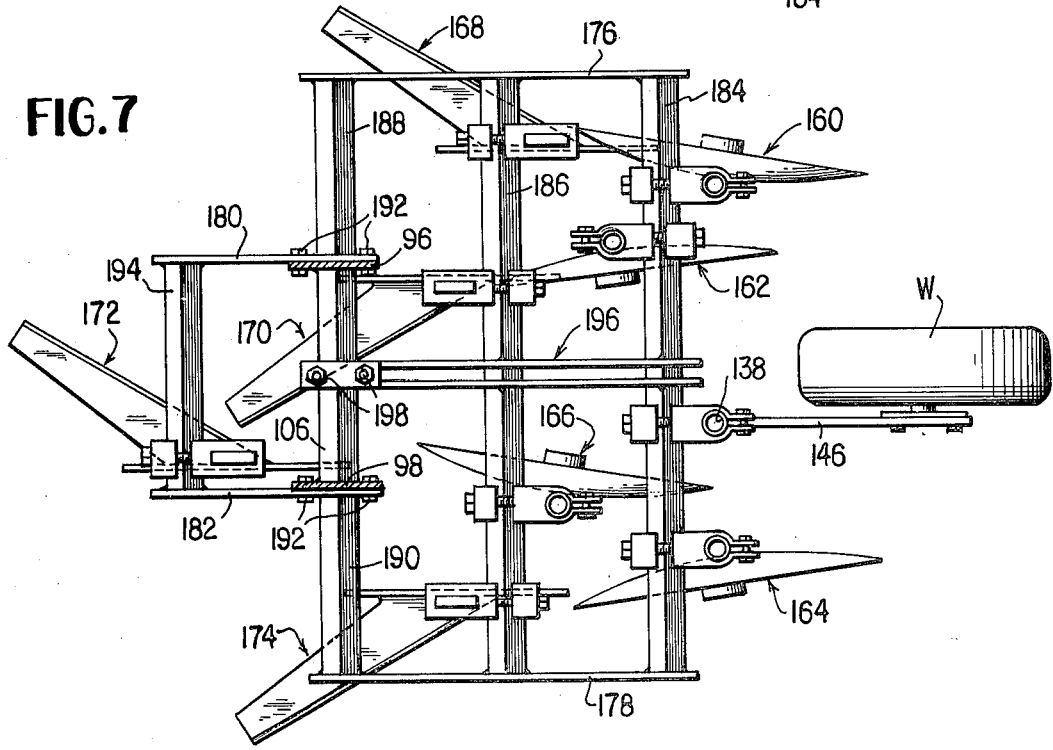
FIG. 7 is a horizontal section taken substantially along the plane of Section line 7—7 in FIG. 6.
Figure 8:
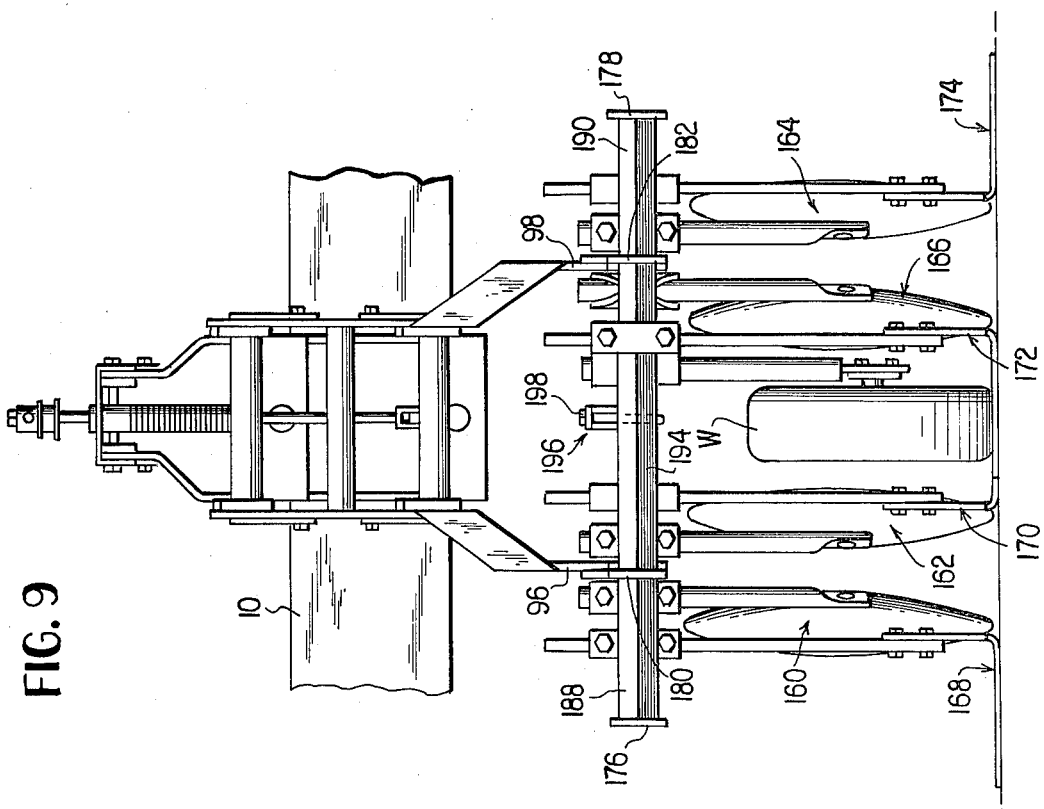
FIG. 8 is a front elevational view of the assembly shown in FIG. 6.
Figure 9:
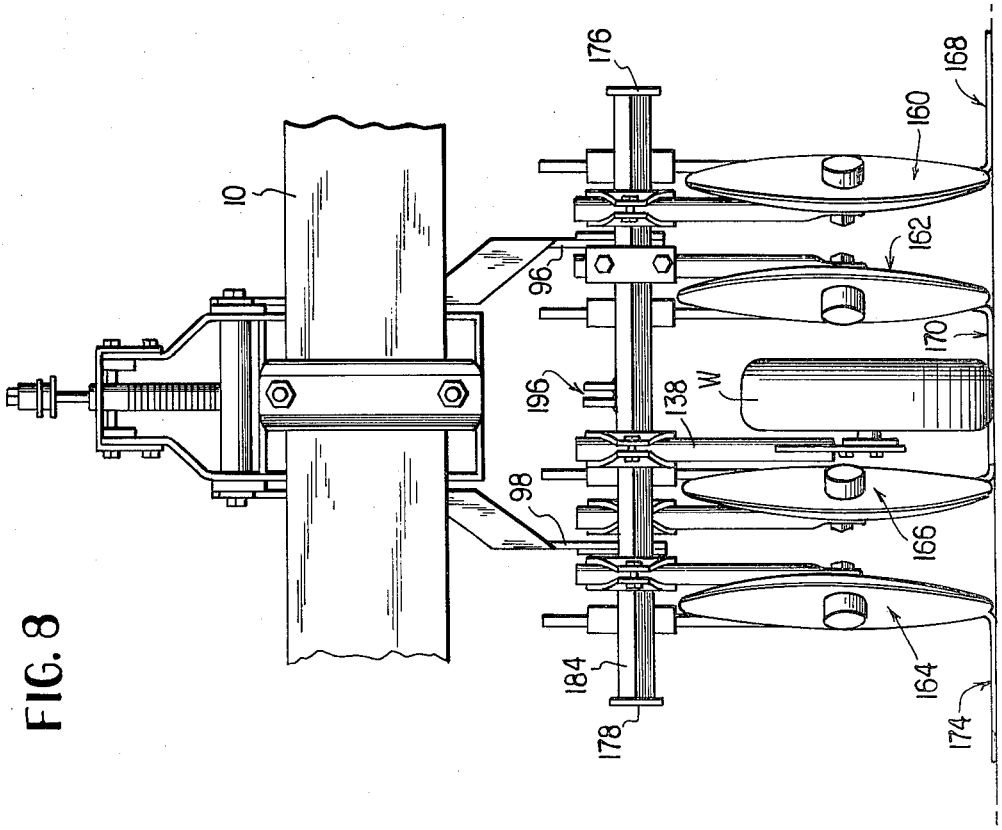
FIG. 9 is a rear elevational view of the assembly shown in FIG. 6.

Other crops may require other arrangements of cultivating tools as, for example, is illustrated in FIG. 7. In FIG. 7, the arrangement shown is particularly suited for cultivating sugar beet rows. Conventionally, this crop is planted in rows spaced 8 to 12 inches apart and the pairs of discs 160, 162 and 164, 166 open a shallow furrow on each side of each row while displacing the soil removed in forming these furrows laterally. Tapered "beet knives" or "half sweeps" as indicated by the reference characters 168, 170, 172 and 174 are located effectively to cultivate the remaining area of the bed by slicing and crumbling a thin layer of soil on the top of the bed.

For this type of tool distribution, a modified form of bed cultivator frame is usefully employed. The side rails in this case are formed of forward sections 176 and 178 for the two respective side rails and the rear portions 180 and 182. The forward sections 176 and 178 are relatively widely spaced and are joined permanently by the two transverse tool bars 184 and 186.

The rearward portions of the sections 176 and 178 have the tool bars 188 and 190 permanently attached thereto and they bridge between the sections 176, 180 and 178, 182, as is illustrated best in FIG. 7. The legs 96 and 98 of the parallelogram linkage frame fit between the rearward sections 180 and 182 as illustrated in FIG. 7 and are simply bolted thereto as by the bolts 192 as illustrated. Finally, the rearward ends of the sections 180 and 182 are joined by a further tool bar 194 which permanently joins these portions together as illustrated. The parallelogram linkage frame is identical to that previously described in conjunction with FIG. 1. Thus, it will be seen that the parallelogram linkage frame lends itself readily to adaptation with different types of bed cultivator frames, all to the end of providing a multiplicity of available tool bars with which to mount the necessary cultivating tools.

In order to rigidify the assembly, the brace 196 as shown in FIG. 7 is employed. The brace is permanently affixed as by welding to the two tool bars 184 and 186 and extends into overlying relation to the tool bar 106, to which it is removably clamped by the bolts 198.

What is claimed is:

1. A cultivator attachment adapted to be connected to a main tool bar for cultivating bed-planted crop rows by means of cultivating members which engage the rows, comprising in combination:
    a parallelogram linkage frame unit adapted to be connected to a main tool bar in trailing relation thereto and including a vertically disposed yoke movable in vertical, free-floating fashion; and
    a bed cultivator frame of open, rectangular configuration detachably secured to the lower end of said yoke, said frame including a plurality of longitudinally spaced, horizontally extending tool bars and a pair of longitudinally extending side rails secured to the respective opposite ends of said tool bars;
    said yoke presenting transversely spaced leg portions at the lower end thereof and said side rails being in engagement therewith and secured thereto.

2. A cultivator attachment for a main tool bar, comprising in combination:
    a vertical mast adapted to be attached to a main tool bar;
    upper and lower arms pivotally attached to said mast and extending generally horizontally therefrom;
    a supporting yoke pivotally attached to the free ends of said arms and depending therefrom to present a pair of laterally spaced legs, and a first elongate tool bar, said first tool bar having its opposite ends in abutting relation to the respective inner sides of said legs and extending between and rigidly and permanently joining said legs; and
    a bed cultivator frame detachably connected to said legs, said bed cultivator frame comprising a pair of horizontally extending and laterally spaced side rails engaging the respective outer sides of said legs and detachably connected between their ends to said legs, a second tool bar extending between and joining the forward ends of said side rails beyond said first tool bar, and a third tool bar extending between and joining the rearward ends of said side rails behind said first tool bar.

3. In a cultivator attachment adapted to be connected to a main tool bar and particularly adapted for cultivating bed-planted rows of crops, the combination of:
a parallelogram linkage frame adapted to be attached to a main tool bar and including trailing arms carrying a supporting yoke, said supporting yoke presenting laterally spaced, depending legs, and a first transverse tool bar having its opposite ends abutting the respective inner sides of said legs and rigidly attached thereto and thereby joining said legs;
a bed cultivator frame of open, rectangular form including longitudinally extending opposite side rails and a plurality of transverse tool bars extending between and rigidly joining said side rails; and
means detachably connecting said legs to the respective outer sides of said side rails between the opposite ends thereof whereby said first tool bar is located in spaced parallel relation with respect to and between the tool bars of said bed cultivator frame.

* * * * *